United States Patent [19]
Hotton

[11] 3,969,172
[45] July 13, 1976

[54] METHOD AND APPARATUS FOR FORMING JOINTS IN THERMOPLASTIC STRIP

[75] Inventor: Joseph G. Hotton, Sterling Heights, Mich.

[73] Assignee: Neumann Engraving Co., Madison Heights, Mich.

[22] Filed: May 22, 1975

[21] Appl. No.: 579,955

[52] U.S. Cl.............................. 156/211; 156/257; 156/443; 156/499; 156/510
[51] Int. Cl.² ......................................... B31F 3/00
[58] Field of Search ........... 156/211, 311, 322, 304, 156/251, 257, 268, 204, 227, 510, 212, 217, 499, 443; 219/101, 106, 153; 428/263, 267, 81; 52/631

[56] References Cited
UNITED STATES PATENTS

| | | | |
|---|---|---|---|
| 1,071,490 | 8/1913 | Winfield et al. | 219/153 X |
| 2,201,669 | 5/1940 | Kraft | 156/211 X |
| 2,246,660 | 6/1941 | Bawtenheimer | 156/211 |
| 2,886,482 | 5/1959 | Huffman | 156/251 X |
| 2,972,371 | 2/1961 | Hermann et al. | 156/499 |
| 3,186,891 | 6/1965 | Gelling et al. | 156/499 X |
| 3,822,160 | 7/1974 | La Barge et al. | 156/212 |

FOREIGN PATENTS OR APPLICATIONS 1,718,163  5/1963  Japan................................. 156/211

Primary Examiner—David A. Simmons
Attorney, Agent, or Firm—Cullen, Settle, Sloman & Cantor

[57] ABSTRACT

Forming a joint in a thermoplastic strip by cutting a V-shaped notch in the strip, arranging a thin, heated blade within the notch and bending the strip about the apex of the notch for compressing the walls defining the notch against the blade for heating such walls, and then removing the blade and continuing the bending until the walls contact and join together. The notched strip is inserted between a pair of movable compression jaws, and the blade is mounted for reciprocating movement between and outwardly of the jaws. Positioning and holding means are provided for locating and holding the strip during the steps of forming the joint between the jaws.

9 Claims, 20 Drawing Figures

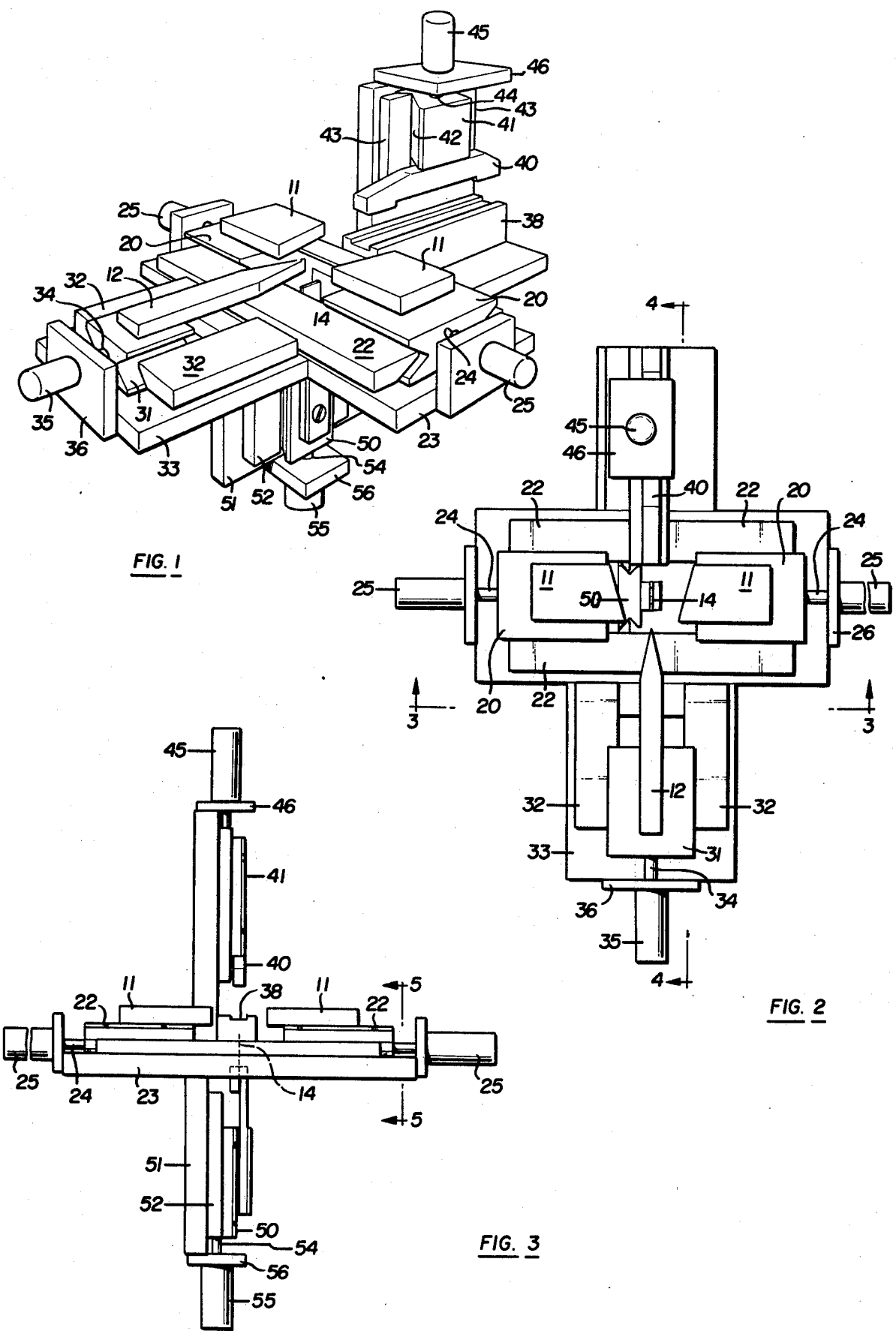

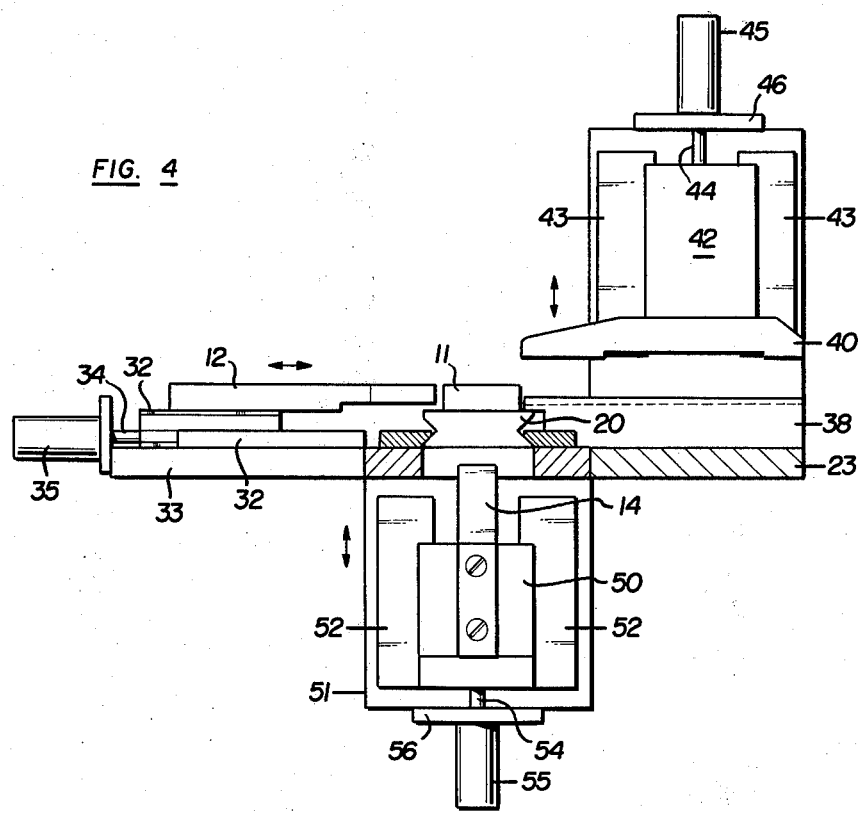
FIG. 4
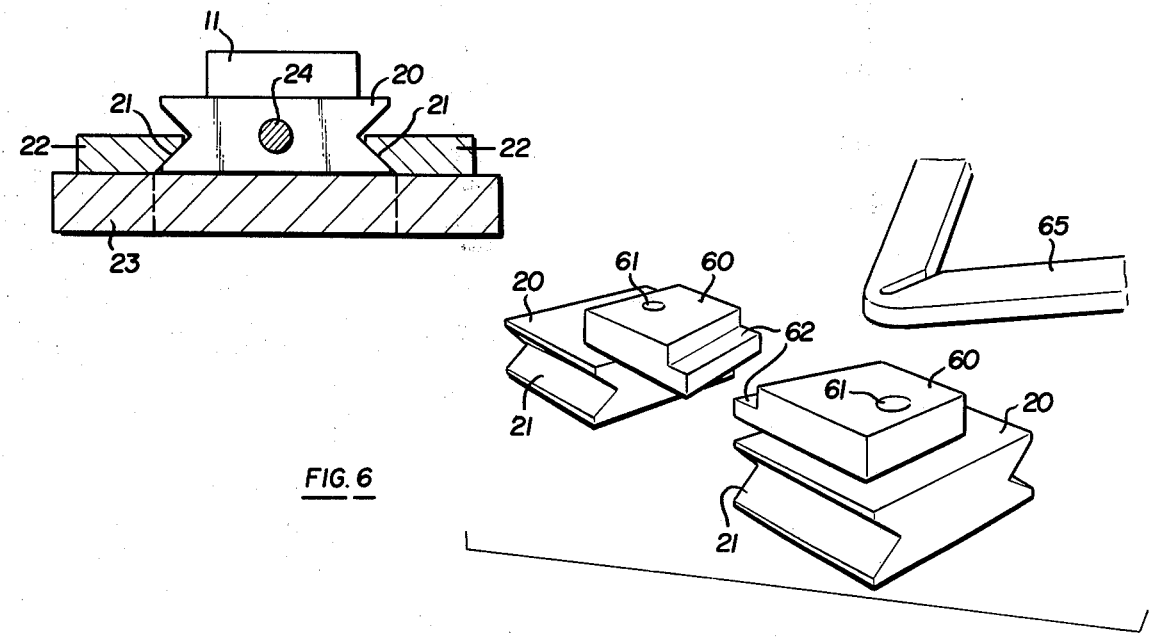
FIG. 5
FIG. 6

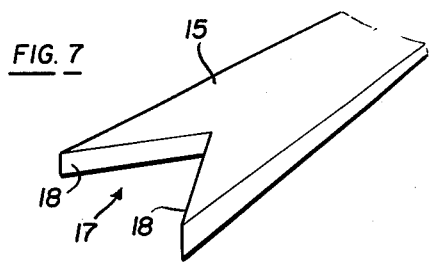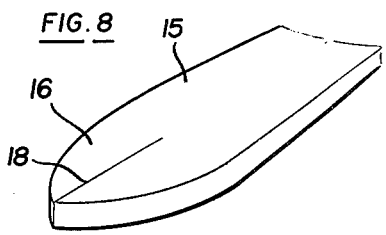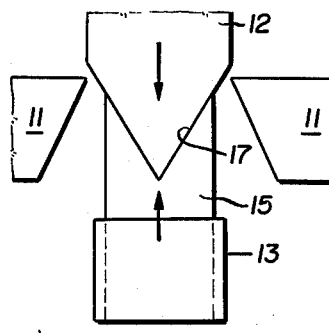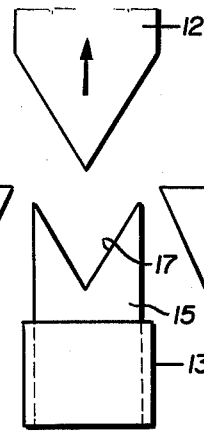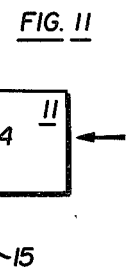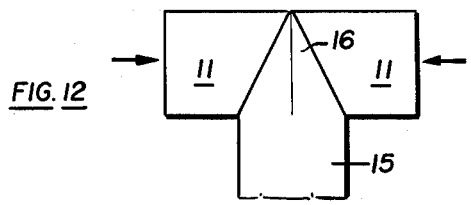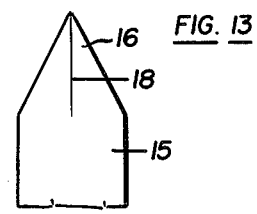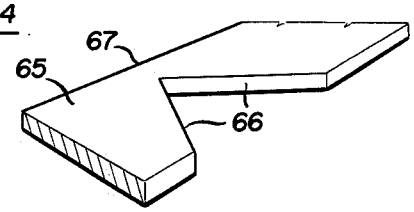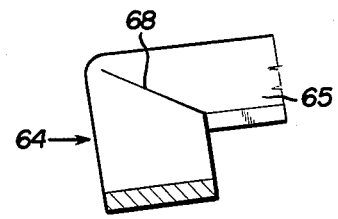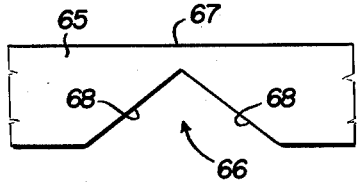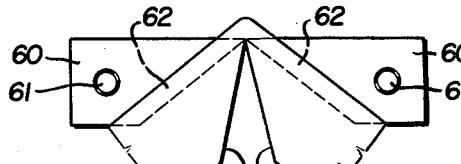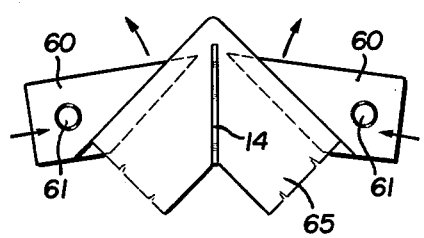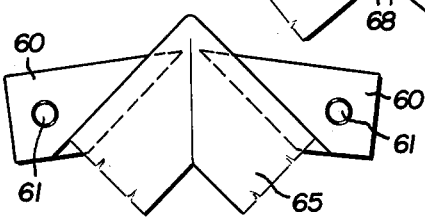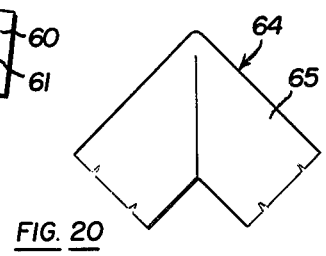

METHOD AND APPARATUS FOR FORMING JOINTS IN THERMOPLASTIC STRIP

BACKGROUND OF INVENTION

One type of trim strip used on automobile bodies for decorative and bump protection purposes consists of a long, narrow thermoplastic strip which may be either partially or entirely covered with a thin outer layer of a chrome-appearing plastic film. By way of example, such strips may extend the length of the body of an automobile along the sides thereof and formed in sections to accomodate the doors, etc. Such strips may be fastened to the automotive body either by an appropriate adhesive or by mechanical fastening clips or screws.

For decorative purposes, usually one and sometimes both opposite ends of such a long strip is formed with a pointed or spear-like end. To form such end, a V-shaped notch has been formed in the end of the strip, the walls of the notch have been coated with a suitable adhesive and thereafter, the walls bent towards each other and held until setting of the adhesive.

Another type of trim strip, used for example on the side body panels of stationwagons, is likewise formed of a thin thermoplastic material, either with or without chrome-like films applied thereto for decorative purposes, with these strips being wider than the abovementioned strips and being formed like picture frames, to give a four-sided arrangement. In the past, this type of trim strip has been assembled into the picture frame relationship by cutting their opposite ends at angles and abutting them against adjacent-angled ends of strips and securing these together by adhesive to form a miter joint.

The manufacture of the spear-end and the mitered corner joints of both of the above types of trim strips has been a relatively inefficient, slow process which, quite frequently, has resulted in poor, i.e., unacceptable quality, joints.

Thus, this invention relates to a process and apparatus for forming such type joints in plastic strips, which eliminates the use of adhesives and produces a far better quality joint more rapidly and at lower cost. While the invention focuses on trim strips, it may also be applied to similar strips used for other purposes.

SUMMARY OF INVENTION

The invention herein contemplates forming a joint, either of the corner variety or end variety, on elongated, narrow thermoplastic strips which comprises the steps of forming a V-shaped notch in a strip, then bending the walls of the notched portion towards each other and against a heated blade located axially of the notch to momentarily heat the notch walls. Thereafter, the blade is removed and the bending of the notch walls towards each other continues until they contact and fuse together.

The invention herein further contemplates a simplified apparatus for performing this process, which apparatus is composed of five reciprocally-mounted members, namely, a pair of opposed jaws arranged to reciprocate towards each other for compressing the joint area of the strip arranged between them, a positioning and stop member for reciprocating between the jaws and entering into the notch in the strip for locating the strip properly between the jaws and thereafter, for reciprocating away, a reciprocating clamp which holds the strip and engages it from the time the positioning stop enters the notch until the process is complete, and a reciprocating heated blade which enters and is arranged axially of the notch, thereof, upon removal of the positioning stop and within a short time, reciprocates out of the notch upon momentary heating of the walls thereof.

In general, the apparatus parts operate in the following sequence: First, the jaws move apart; second, the positioning stop member slides between the jaws; third, an end-notched strip is arranged between the jaws with the notch receiving a portion of the positioning stop; fourth, the clamp grips the strip and holds it firmly; fifth, the positioning stop withdraws from between the jaws; sixth, the heated blade moves into the notch and is arranged axially of the notch; seventh, the jaws compress or move the strip portions defining the notch towards each other and against the heated blade; eighth, the blade retracts from the notch and, finally, the jaws continue movement to place the notch walls into contact and hold them there until they are fused together. Thereafter, the jaws retract and the clamp opens for removal of the strip. Typically, the entire operation can be performed in a matter of seconds, as for example, ten seconds or less.

For forming mitered corner joints, the means for positioning the strip may be combined with the jaws themselves. Thus, simplifying the apparatus even further.

The process and apparatus herein produces a high-quality joint at rapid speeds, thus, reducing costs and improving the product.

These and other objects and advantages of this invention will become apparent upon reading the following description, of which the attached drawings form a part.

DESCRIPTION OF DRAWINGS

FIG. 1 is a perspective view of the apparatus herein.

FIG. 2 is a top plan view of the apparatus.

FIG. 3 is an elevational view taken in the direction of arrows 3—3 of FIG. 2.

FIG. 4 is an elevational side, cross-sectional view taken in the direction of arrows 4—4 of FIG. 2.

FIG. 5 is an enlarged cross-sectional view of the jaw slide system taken in the direction of arrows 5—5 of FIG. 3.

FIG. 6 is an enlarged, perspective view of modified jaws for forming corner joints.

FIG. 7 shows a notched end strip prior to processing.

FIG. 8 shows the completed spear or pointed end strip.

FIGS. 9–13, inclusive, show successive steps in the formation of the pointed end joint.

FIG. 14 shows a notched strip for forming a corner joint.

FIG. 15 shows the completed corner joint.

FIGS. 16–20 show the successive steps in the formation of the corner joint.

DETAILED DESCRIPTION

The apparatus, generally designed as 10, is formed of five main parts, namely, a pair of reciprocating jaws 11, a pointed-end positioning stop 12, which is reciprocally mounted for positioning between and then outwardly of the jaws, a strip-clamping means 13 and a reciprocally-mounted electrically-heated blade 14.

The process and the operation of the apparatus herein begins with a thin, elongated thermoplastic strip 15 which may be made of polyvinyl chloride or other such thermoplastic material, as illustrated in FIGS. 7 and 8. To form the spear or pointed end 16 on the strip, a V-shaped end notch 17 is cut in the strip (See FIG. 7) and, thereafter, the walls defining the notch are squeezed together so that such walls 18 are fused together along the center line of the strip.

Referring to FIGS. 9–13, the sequence of forming the pointed end begins with the jaws 11 spread apart and the pointed end positioning stop 12 located between the jaws. As shown in FIG. 9, the notched end strip is located between the jaws, as for example, manually inserted, with the notch 17 receiving the pointed end of the positioning stop 12. Once positioned, a clamp 13 operates to hold the strip in position.

Next, as shown in FIG. 10, the positioning stop 12 withdraws and the heated blade slides into the notch and is positioned along the axis thereof. As shown in FIG. 11, the jaws then move together (See arrows) to move the walls 18 of the notch against the heated blade momentarily, as for example, about one tenth of a second where the blade may be heated to about 1,100°F. At that point, the blade retracts and the jaws continue inward movement, as shown in FIG. 12 to further bend the strip so that the walls are in contact and are held until they fuse together, which may take a matter of a few seconds. Then, the jaws retract outwardly and the completed pointed-end strip, as shown in FIG. 13, is removed.

Turning now to the apparatus, which is described below in more detail, the jaws 11 have inner faces which are appropriately sloped or curved for shaping and moving the strip end portions and the jaws are each mounted upon a slidably support block 20 provided with side guide grooves to receive corresponding portions of guide rails 22 which are mounted upon a base plate 23. Thus, the blocks may reciprocate, carrying the jaws with them.

To reciprocate the jaw support blocks, piston rods 24 are attached to the ends of the blocks and fit within air cylinders 25 with a conventional mechanism for moving the pistons longitudinally. Each air cylinder is supported upon the support bracket 26 mounted upon the base plate 23. Thus, operation of the air cylinder from a suitable source of compressed air with appropriate timing valves, causes the jaws to move inwardly and outwardly as desired. The pneumatic system for providing compressed air and the controls for operating the cylinders are omitted since, these are all conventional and commercially available.

The positioning stop 12 is mounted fixedly upon a slidable support block 30, having side guide grooves 31 engaging correspondingly-shaped guide rails 32 mounted upon a base plate 33. To move the block, a piston rod 34 engages the block and fits within an air cylinder 35 which air cylinder is mounted upon a support bracket 36 fastened to the base plate 33.

The clamp 13 comprises a base or anvil strip 38 upon which a strip may be laid manually, and a vertically-arranged base plate 39 carrying a clamping block or platten 40 for moving down and clamping the strip against the anvil or base 38. The clamp block is secured to a clamp-reciprocating block 41 having side guide grooves 42 fitted within correspondingly-shaped guide rails 43 which are mounted upon the vertical base plate 39. As in the prior parts of the equipment, a piston 44 is connected to the block 40 and fitted within an air cylinder 45 which is mounted by a bracket 46 to the vertical base plate 39.

The blade 14 is secured upon a slide block 50, which is mounted upon a vertical base plate 51 by means of guide rails 52 engaged within guide grooves. A piston rod 54 connects to the slide block 50 and fits within an air cylinder 55 mounted by a bracket 56 upon the vertical base plate 53.

The blade 14 may be heated by a suitable electrical resistor, either embedded in the blade or connected to it, or the blade itself may function as a resistor, so as to maintain it at a constant temperature. Although this temperature may change, depending upon the plastic material and also depending upon the time of cycle, by way of example, it may be maintained at about 1,100°F. which will, then, permit a one-tenth of a second heating time against the plastic where the plastic is made of polyvinyl chloride or other thermoplastics in the general melting range of same.

All of the air cylinders are suitably connected together by an air supply line and a compressed air source with valving and sequencing switches, which may be manual or automatic, as appropriate.

The above-described apparatus performs the steps of forming the spear or pointed end on the elongated strip. For purposes of forming a picture frame or miter-type corner joint, the slidable positioning-stop member may be eliminated and modified jaws 60 may be used instead. Thus, as shown in FIG. 6, the jaws 60 are connected by pivot pins 61 to the blocks 20 and these jaws may have their opposing faces shaped with support ledges 62 upon which the plastic strip may be placed.

In operation, referring first to FIGS. 14 and 15, the mitered-corner 64 is formed on a wider, flattened thermoplastic strip 65 by providing a V-shaped notch, (see FIG. 14) and, thereafter, bending the strip at the apex 67 until the notch walls 68 contact and fuse together.

The steps are schematically shown in FIGS. 16–20 and consist of, first, notching the strip as shown in FIG. 16, then partially bending the strip manually and inserting it between the jaws and resting it upon the ledges 62, as shown in FIG. 17. Thereafter, the jaws are operated to move inwardly, as well as to pivot, to compress the notch walls together and against the heated blade 14. After momentary heating, the blade is retracted and the compression of the jaws continue, as in FIG. 19, until the notch walls are in contact where they are held until they fuse together to form the complete corner. Thereafter, the cornered strip is removed, as shown in FIG. 20. In this manner, a number of corners can be made on a continuous strip and the angles of the corners can be determined by the angle of the V-shaped notch cut into the strip.

In both types of strips, the basic sequence of operation is the same, although it may be necessary to use a different-shaped clamp, platten and anvil to support the corner-forming strip as opposed to the end joint.

Having fully described an operative embodiment of this invention, I now claim:

1. Apparatus for forming a joint in a strip of thermal plastic material having a notch, defined by laterally opposed notch walls, formed therein, comprising:
   a pair of opposed jaws mounted for substantially rectilinear movement inwardly toward and outwardly, away from each other;
   means for holding the strip between the jaws, with the notch substantially axially centered therebetween, whereby inward movement of the jaws toward each other compresses the strip portions adjacent the notch and causes the walls defining the notch to move together;

a thin heated blade arranged in a plane centrally between the jaws and aligned with the axis of the notch, said blade having opposed, generally parallel faces, and being movable in a direction generally perpendicular to the axis of movement of each of the jaws, and means for reciprocating the blade inwardly to a position between the jaws and outwardly to a position remote from the jaws for withdrawing the blade; and means for (a) moving the jaws to engage the strip portions adjacent the notch and to press the notch walls against the opposite generally parallel faces of the heated blade for momentarily heating such walls, and (b) thereafter moving the jaws further toward one another after withdrawal of the heated blade to compress and hold the walls of the notch together until the faces thereof are joined.

2. An apparatus as defined in claim 1, and further including means for initially positioning the strip between the jaws, including a V-shaped member axially aligned with said plane and shaped to fit into the notch;

means mounting said member for reciprocation to a first position between said members for functioning as a stop to fit within the notch and position the strip between the jaws, and a second position outwardly of the jaws to clear the notch for receipt of said blade.

3. An apparatus as defined in claim 2, and said means for holding the strip including a releaseable clamp for clamping the strip after said notch receives the V-shaped member and for continuing to clamp the strip after the V-shaped member is moved outwardly and while the blade is moved inwardly and outwardly and the notch walls are compressed together for joining.

4. An apparatus as defined in claim 1, and wherein, the said strip is notched in a V-shape on one edge and between its ends and is partially bent about the apex of the notch before insertion between the jaws;

and further including means for positioning the strip, comprising ledges formed on each jaw upon which a portion of the strip may be rested;

and each jaw having a jaw face portion adjacent said ledge for engaging a portion of the strip edge opposite the notched edge and adjacent the notches.

5. An apparatus as defined in claim 4, and each jaw being pivotally mounted upon a reciprocally-mounted jaw carrier, wherein the jaw may pivot so that its face remains in contact with the strip edge portion as the notch is compressed, and may move inwardly towards the opposing jaw upon its jaw carrier.

6. An apparatus as defined in claim 1, and wherein, said strip is notched on one edge and between its ends and is partially bent about the apex of the notch before insertion within the jaws;

and each jaw being pivotally mounted upon a reciprocally-mounted jaw carrier;

and each jaw having a jaw face portion for engaging a portion of the strip edge opposite the notched edge and adjacent the notches;

wherein, the jaw may pivot so that its face remains in contact with the strip edge portion as the notch is compressed and may, further, move inwardly towards the opposing jaw upon its jaw carrier.

7. A method for forming a joint in a strip of thermoplastic material, comprising the steps of:

forming a notch in the strip;

positioning the notch in alignment with a pair of opposed, axially movable compression jaws;

displacing a thin, heated blade generally perpendicular to the axis of movement of each of the compression jaws to a position within the notch along the central axis of the notch;

displacing the compression jaws toward each other and bending the strip about the apex of the notch to move the walls defining the notch towards each other and against the opposite sides of the blade for heating said walls;

removing the blade from between the walls; and then placing the heated strip walls in contact and holding them in contact until they are fused together.

8. A method as defined in claim 7, and including cutting said notch in the form of a V in the end of a relatively narrow strip, wherein the joint forms a pointed end on said strip.

9. A method as defined in claim 7, and including cutting said notch in the form of a V in a side edge of a relatively narrow strip, wherein, a corner joint is formed in said strip.

* * * * *